Oct. 12, 1954 L. G. BRINSON ET AL 2,691,522
BOAT TRAILER SHOCK ABSORBER
Filed Sept. 11, 1950 2 Sheets-Sheet 1

Leon G. Brinson
Barnard Spencer, Jr.
INVENTORS

Oct. 12, 1954

L. G. BRINSON ET AL 2,691,522

BOAT TRAILER SHOCK ABSORBER

Filed Sept. 11, 1950

Leon G. Brinson
Barnard Spencer, Jr.
INVENTORS

BY *[signatures]*
Attorneys

Patented Oct. 12, 1954

2,691,522

UNITED STATES PATENT OFFICE 2,691,522

BOAT TRAILER SHOCK ABSORBER

Leon G. Brinson and Barnard Spencer, Jr., Gainesville, Fla.

Application September 11, 1950, Serial No. 184,276

8 Claims. (Cl. 267—60)

This invention relates to improvements in attachments for trailers which form a component part thereof.

An object of this invention is to provide a new means for suspending the trailer by an assembly which includes a substantially vertical tube having a piston operable therein with a spring opposing the movement of said piston, the piston being grease packed, whereby when the wheels are attached to the lower end of the piston the boat trailer will not be subjected to severe shock in road travel.

A further object of this invention is to improve the riding qualities of a trailer which is adapted to convey a boat or other object from one locality to another on land.

Ancillary objects and features of importance will become apparent in following the description of the illustrated form of the invention.

In carrying out this invention, there is illustrated fragmentarily a part 10 of a conventional trailer. Any type of trailer may be adapted to accommodate the instant device, for example, the trailer illustrated in Patent No. 2,498,014.

The framing part 10 is a downwardly opening tube 12 and is provided with a grease fitting 14 for the application of a lubricant under pressure into the bore 16 thereof.

Figure 1:
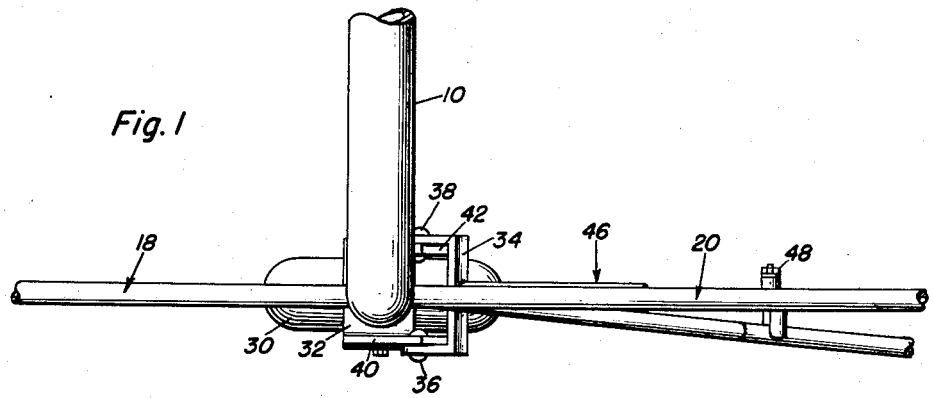
Figure 1 is a fragmentary top plan view of the attachment illustrating fragmentarily a part of a trailer.
Figure 2:
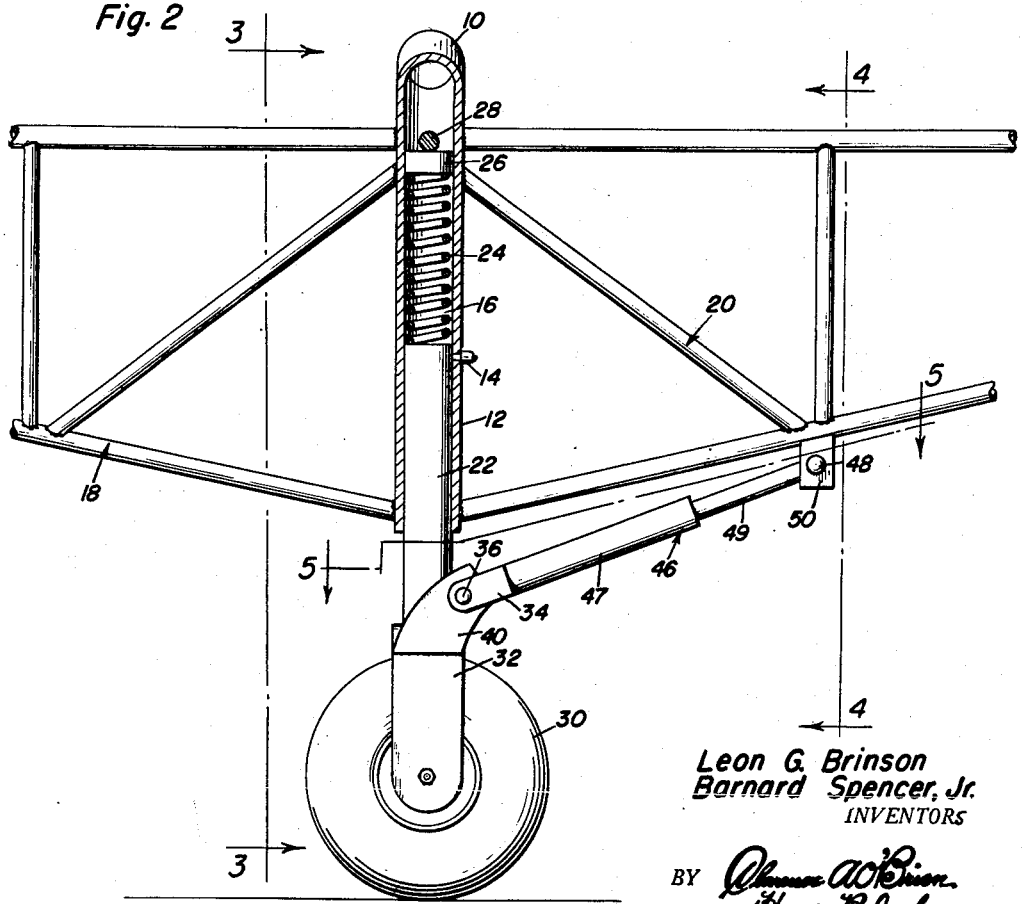
Figure 2 is a side view of the structure shown in Figure 1, portions being broken away in section to illustrate detail of construction.
Figure 3:
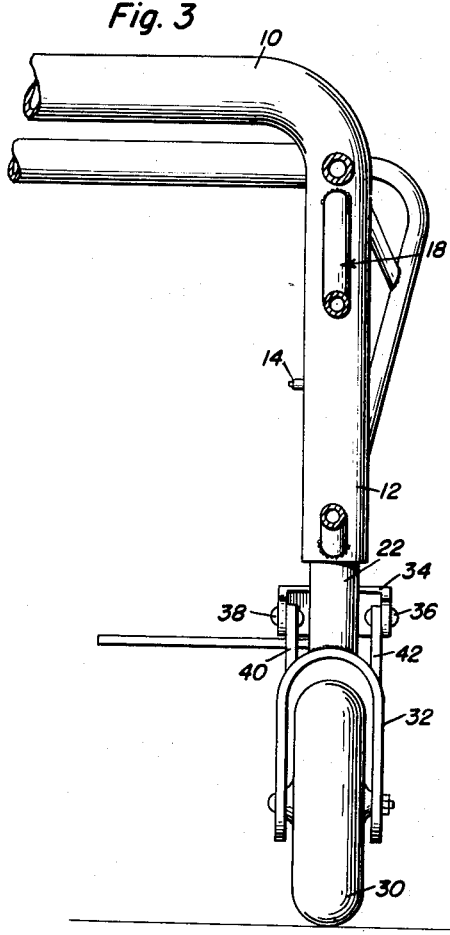
Figure 3 is a view taken substantially on the line 3—3 of Figure 2 and in direction of the arrows.
Figure 4:
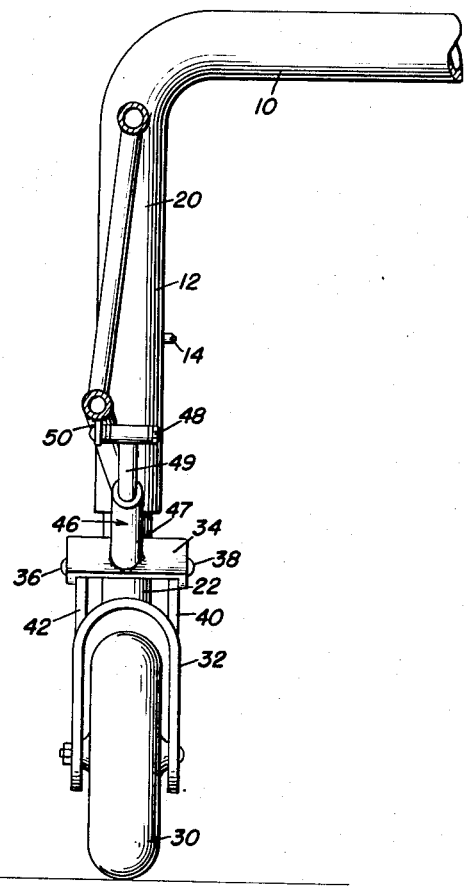
Figure 4 is a sectional view taken substantially on the line 4—4 of Figure 2 and in the direction of the arrows; and, Figure 5 is a sectional view taken substantially on the line 5—5 of Figure 2 and in the direction of the arrows.
Figure 5:
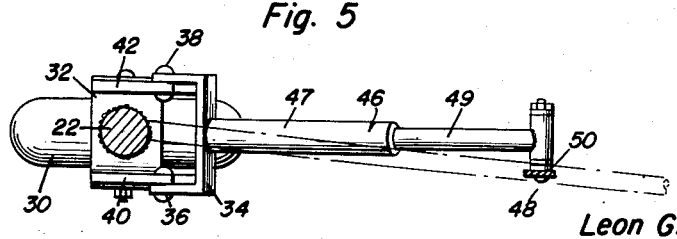

As noted from Figure 2, other structural framing 18 and 20 is connected to the sides of the downwardly opening tube 12, this framing also constituting a part of the conventional structural framing of the boat trailer.

The improvement consists of a piston or plunger 22 which is mounted for vertical reciprocatory movement in the bore 16 of the tube 12. There is a spring 24 which constitutes a yieldable means to oppose the upward movement of the piston 22 in the bore of the tube 12. This spring reacts on a stop 26 which is limited in a separate movement by the transverse pin 28, carried by the tube 12.

A wheel 30 is mounted in the wheel yoke 32, this yoke being provided with a bracket 34 at its upper end which is pivoted by means of the trunnions 36 and 38 to the ears 40 and 42 projecting from the upper part of the wheel yoke 32.

An extensible linkage 46 is fixed at one end to the bracket 34 and fixed by means of the pin 48 to the bracket 50. The bracket is welded or otherwise rigidly fixed to a part, for example, that indicated at 20 of the structural make-up of the trailer, and serves as a thrust member.

The extensible linkage consists of a tube 47 having the rod 49 slidably disposed therein. It is the rod which is pivoted by means of the pin 42, while the tube or cylinder 47 is fixed to a bracket 34.

In operation when the wheel 30 strikes a bump or hole in the rod, it tends to move upwardly, opposed by at least a part of the entire weight of the trailer. This weight being reacted through the pin 28 and stop 26 to the spring 24, opposes the upward movement of the piston 22. In order to prevent lateral thrusts and turns of the piston or plunger 22, the extensible linkage is called into play. This linkage allows the yoke 32 and hence the plunger 22 to move vertically but prevents it from rotating.

Having described the invention, what is claimed as new is:

1. As a part of a boat trailer which includes structural framing, a downwardly opening tube having a piston vertically movable therein, means yieldingly opposing the upward movement of the piston in the tube, a wheel yoke disposed at the lower end of said piston, a wheel carried thereby, and an extensible linkage connected to said wheel yoke and to the structural framing to prevent rotation of said plunger in said tube.

2. The combination of claim 1 and means to introduce lubricant into said tube, said last-mentioned means being attached to said tube and opening thereto intermediate the ends thereof.

3. In combination with a trailer having a structural frame member consisting of a downwardly opening tube, a plunger mounted for vertical movement in said tube, means yieldingly opposing the inward movement of said plunger in said tube, and a wheel carried by the lower end of said plunger, said wheel having a yoke connected thereto, said yoke connecting said wheel to the lower end of said plunger, an extensible linkage connected at one end to said yoke and pivoted at the other end to a part of the trailer framing by a fixed pivot to prevent rotation of said plunger in said tube.

4. In combination with a trailer frame, an individual wheel mounting assembly for each wheel comprising a downwardly opening tube mounted on the frame, a plunger freely telescoping within said tube and projecting outwardly therefrom, means yieldingly opposing the upward movement of the plunger in the tube, a wheel journaled on the outwardly projecting portion of said plunger, and a freely extensible linkage connecting the outwardly projecting portion of the plunger and the trailer frame to prevent rotation of the plunger within the tube.

5. In combination with a trailer frame, an individual wheel mounting assembly for each wheel comprising a downwardly opening tube mounted on the frame, a plunger freely telescoping within said tube and projecting outwardly therefrom, means yieldingly opposing the upward movement of the plunger in the tube, a wheel journaled on the outwardly projecting portion of said plunger, and a freely extensible linkage connecting the outwardly projecting portion of the plunger and the trailer frame to prevent rotation of the plunger within the tube, said extensible linkage including an extensible member pivoted at its ends to said plunger and said frame.

6. The combination of claim 4 wherein a wheel yoke is formed on the outwardly projecting end of the plunger, said wheel being journaled on said yoke.

7. In combination with a trailer frame, a wheel mounting assembly comprising a downwardly opening tube on the frame, a plunger freely slidably telescoping into said tube and having a free end projecting exteriorly from said tube, a yoke rigidly connected to the outwardly projecting portion of said plunger and a wheel individually journaled on said yoke, an extensible linkage pivotally interconnecting said plunger and said frame to prevent rotation of the plunger within the tube.

8. In combination with a trailer frame, a wheel mounting assembly comprising a downwardly opening tube on the frame, a plunger freely slidably telescoping into said tube and having a free end projecting exteriorly from said tube, a yoke rigidly connected to the outwardly projecting portion of said plunger and a wheel individually journaled on said yoke, an extensible linkage pivotally interconnecting said plunger and said frame to prevent rotation of the plunger within the tube, said extensible linkage being pivotally secured at its ends to said plunger and said frame.

References Cited in the file of this patent

UNITED STATES PATENTS

| Number | Name | Date |
|---|---|---|
| 1,178,692 | Trucano | Apr. 11, 1916 |
| 1,265,677 | Knapp | May 7, 1918 |
| 1,653,361 | Krammer | Dec. 20, 1927 |
| 2,030,263 | Mercer | Feb. 11, 1936 |
| 2,171,889 | Payson | Sept. 5, 1939 |
| 2,444,231 | Sanford | June 29, 1948 |
| 2,545,128 | Young et al. | Mar. 13, 1951 |
| 2,634,010 | Sass | Apr. 7, 1953 |